US009051976B2

(12) United States Patent
Kuwahara et al.

(10) Patent No.: US 9,051,976 B2
(45) Date of Patent: Jun. 9, 2015

(54) DRIVING FORCE TRANSMISSION DEVICE

(75) Inventors: Takashi Kuwahara, Isehara (JP);
Tomoharu Fuji, Isehara (JP); Shigeru Ishii, Atsugi (JP); Tatsuya Osone, Atsugi (JP); Kunihiko Nishimura, Fujisawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 411 days.

(21) Appl. No.: 13/698,797

(22) PCT Filed: May 17, 2011

(86) PCT No.: PCT/JP2011/061333
§ 371 (c)(1),
(2), (4) Date: Nov. 19, 2012

(87) PCT Pub. No.: WO2011/145624
PCT Pub. Date: Nov. 24, 2011

(65) Prior Publication Data
US 2013/0062980 A1    Mar. 14, 2013

(30) Foreign Application Priority Data

May 21, 2010    (JP) .................... 2010 116917

(51) Int. Cl.
| *H02K 5/10* | (2006.01) |
| *F16D 25/08* | (2006.01) |
| *B60K 6/40* | (2007.10) |
| *B60K 6/48* | (2007.10) |
| *F16D 25/12* | (2006.01) |
| *B60K 6/387* | (2007.10) |
| *B60K 6/405* | (2007.10) |
| *B60K 6/543* | (2007.10) |
| *H02K 7/00* | (2006.01) |
| *F16D 48/02* | (2006.01) |

(52) U.S. Cl.
CPC ............... *F16D 25/083* (2013.01); *B60K 6/40* (2013.01); *B60K 6/48* (2013.01); *B60K 2006/4825* (2013.01); *F16D 25/12* (2013.01); *F16D 25/123* (2013.01); *Y02T 10/6221* (2013.01); *Y02T 10/6252* (2013.01); *F16D 2048/0287* (2013.01); *F16D 2300/08* (2013.01); *B60K 6/387* (2013.01); *B60K 6/405* (2013.01); *B60K 6/543* (2013.01); *B60Y 2400/4242* (2013.01); *H02K 5/10* (2013.01); *H02K 7/006* (2013.01)

(58) Field of Classification Search
None
See application file for complete search history.

(56) References Cited

U.S. PATENT DOCUMENTS 6,492,742 B1 * 12/2002 Fujikawa et al. ........... 290/40 C
7,017,693 B2 * 3/2006 Omote et al. ............. 180/65.26
(Continued)

FOREIGN PATENT DOCUMENTS

| JP | 2006-137406 A | 6/2006 |
| JP | 2006-298272 A | 11/2006 |
| JP | 2010-105615 A | 5/2010 |

*Primary Examiner* — Tran Nguyen
(74) *Attorney, Agent, or Firm* — Foley & Lardner LLP (57) ABSTRACT

A hybrid driving force transmission device includes a motor generator (9), a multi-plate dry clutch (7), a housing cover (60), a dust seal member (62), and a dust collection structure (63). The multi-plate dry clutch (7) is disposed at a position inner than the motor generator (9). The housing cover (60) is provided to cover the motor generator (9) and the multi-plate dry clutch (7), and divides the internal space into a clutch chamber (64) and a motor chamber (65). The dust seal member (62) is disposed at a position radially outside of a clutch chamber open surface (66) and seals between a rotor (92) and an inner wall (60a) of the housing cover (60). The dust collection structure (63) forms a dust collection space (69) in a region radially between the seal surface (68) formed by the dust seal member (62) and the clutch chamber open surface (66).

4 Claims, 5 Drawing Sheets

(56) References Cited

U.S. PATENT DOCUMENTS

| | | |
|---|---|---|
| 2006/0166778 A1* | 7/2006 | Tabata et al. .................. 475/159 |
| 2007/0108857 A1* | 5/2007 | Nomura et al. ................. 310/78 |
| 2007/0213161 A1* | 9/2007 | Tabata et al. ...................... 475/5 |
| 2008/0099258 A1* | 5/2008 | Berhan ........................ 180/65.2 |
| 2010/0109461 A1 | 5/2010 | Kato et al. |

* cited by examiner

DRIVING FORCE TRANSMISSION DEVICE

TECHNICAL FIELD

The present invention relates to a driving force transmission device applied to a drive system of an electric vehicle and provided with a dry clutch disposed inside a motor.

BACKGROUND ART

As a hybrid driving force transmission device, there has heretofore been known one in which an engine, a motor clutch unit and a transmission unit are coupled, as shown in Japanese Patent Application Publication No. 2006-137406. Among these, the motor clutch unit has a multi-plate dry clutch disposed inside an electric motor. Specifically, the motor clutch unit includes a clutch hub coupled to an output shaft of the engine, a clutch cover having a rotor of an electric motor fixed thereto, and coupled to a transmission input shaft, and a multi-plate dry clutch interposed between the clutch hub and the clutch cover.

SUMMARY OF INVENTION

However, the conventional hybrid driving force transmission device has no seal structure between the multi-plate dry clutch and the electric motor. For this reason, dust such as abrasion powder produced by the use of gears, clutches and the like enters a rotor or stator of the electric motor. Furthermore, in the case of the dry clutch, even though a lot of abrasion powder is produced from the clutch by the engaging thereof, the conventional device has no structural countermeasures against the abrasion powder from the dry clutch. This leads to a problem that the dust such as abrasion powder is deposited around the clutch.

The present invention has been made in consideration of the foregoing problem. It is an object of the present invention to provide a driving force transmission device capable of preventing dust from a clutch chamber from entering into a motor chamber, and of preventing deposition of the dust inside the clutch chamber.

To achieve the foregoing object, a driving force transmission device according to the present invention includes a motor, a dry clutch, a housing, a dust seal member, and a dust collection structure.

The motor rotates around a rotor shaft.

The dry clutch is disposed at a position inner than the motor, and connects or disconnects transmission of driving force.

The housing is provided to cover the motor and the dry clutch, and has an internal space in which a space on the rotor shaft side serves as a clutch chamber to house a friction element of the dry clutch and a space on an outer side of the clutch chamber serves as a motor chamber to house a rotor and a stator of the motor.

The dust seal member is disposed at a position radially outside of a clutch chamber open surface that is an outer peripheral boundary of the friction element, and seals between the rotor and an inner wall of the housing.

The dust collection structure forms a dust collection space in a region radially between a seal surface formed by the dust seal member and the clutch chamber open surface.

As described above, the dust seal member configured to seal between the rotor and the inner wall of the housing is disposed at the position radially outside of the clutch chamber open surface that is the outer peripheral boundary of the friction element. Thus, the dust seal member prevents dust such as abrasion powder from the friction element of the dry clutch from entering into the motor chamber housing the rotor and stator of the motor.

As a result, friction increase, motor abrasion, motor performance degradation and the like due to the dust such as abrasion powder entering into the motor chamber side are prevented.

Meanwhile, the dust collection structure is provided, which forms the dust collection space in the region radially between the seal surface formed by the dust seal member and the clutch chamber open surface. The dust received by the dust seal member is caught and collected in the dust collection space between the seal surface and the clutch chamber open surface. Thus, the dust from the clutch chamber is returned to the clutch chamber, thereby preventing deposition of the dust such as abrasion powder inside the clutch chamber.

An increase in drag torque, facilitation of spline abrasion, and the like due to the deposition of the dust such as abrasion powder inside the clutch chamber are prevented.

DESCRIPTION OF EMBODIMENTS

A configuration to implement a driving force transmission device of the present invention is described below based on an embodiment shown in the drawings.

[Embodiment]

A configuration is first described.

Figure 1:
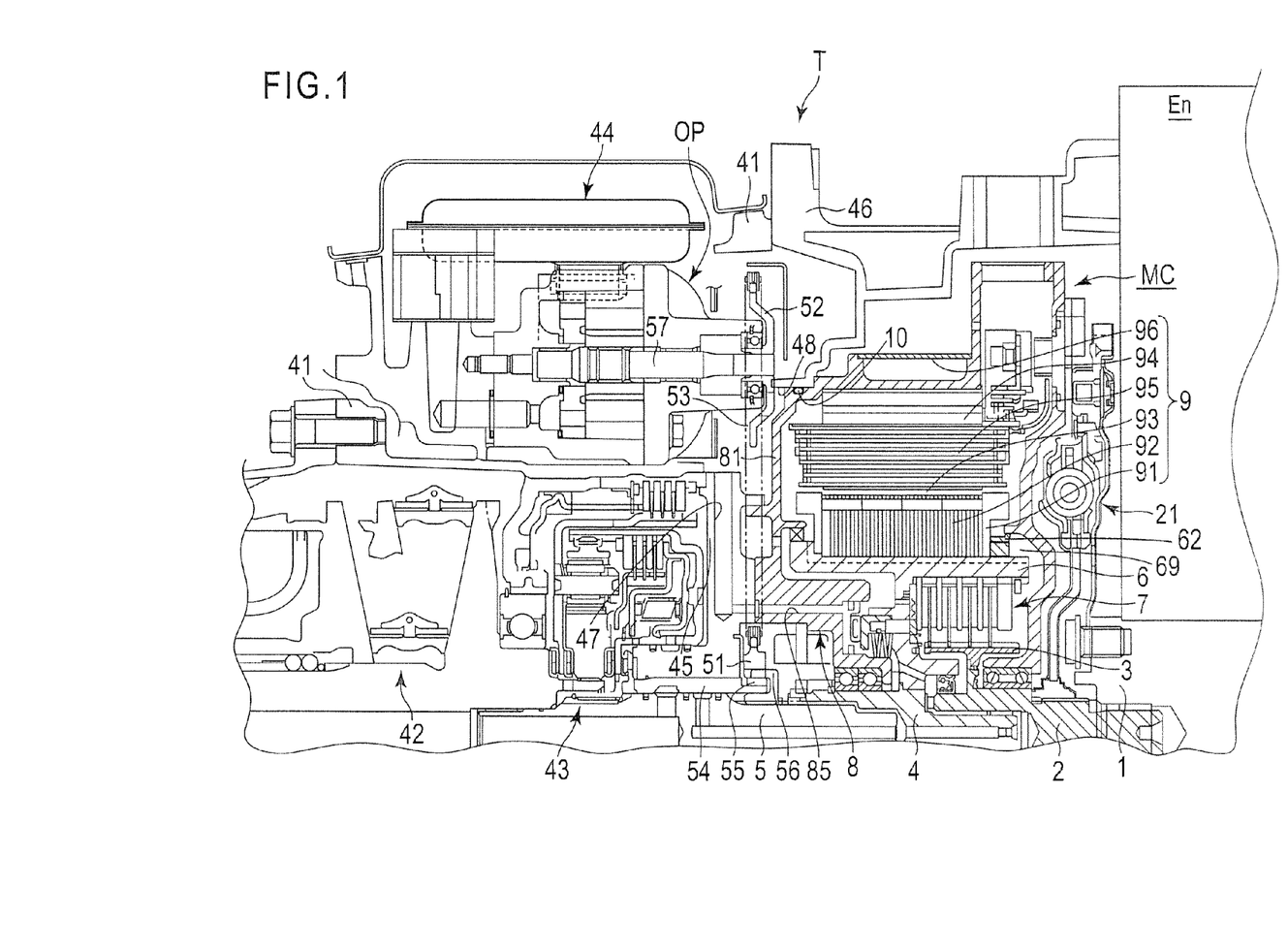
FIG. 1 is an overall schematic view showing a hybrid driving force transmission device (an example of a driving force transmission device) of an embodiment.

FIG. 1 is an overall schematic view showing a hybrid driving force transmission device (an example of a driving force transmission device) of an embodiment. With reference to FIG. 1, an overall configuration of the device is described below.

As shown in FIG. 1, the hybrid driving force transmission device of the embodiment includes an engine En (driving source), a motor-clutch unit MC, a transmission unit T, an engine output shaft 1, a clutch hub shaft 2, a clutch hub 3, a clutch cover shaft 4, a transmission input shaft 5, a clutch cover 6, a multi-plate dry clutch 7, a slave cylinder 8, and a motor generator 9. Note that the slave cylinder 8 configured to hydraulically control the engaging and disengaging of the multi-plate dry clutch 7 is generally called a "CSC (abbreviation for Concentric Slave Cylinder)."

In the hybrid driving force transmission device of the embodiment, when the normal open multi-plate dry clutch 7 is disengaged, a motor generator 9 and the transmission input shaft 5 are coupled through the clutch cover 6 and the clutch cover shaft 4 to set an "electric vehicle drive mode." When the multi-plate dry clutch 7 is hydraulically engaged by the slave cylinder 8, the engine En and the motor generator 9 are coupled and the engine output shaft 1 and the clutch hub shaft 2 are coupled through a damper 21. Then, the clutch hub and the clutch cover 6 are coupled through the engaged multi-plate dry clutch 7 to set a "hybrid vehicle drive mode."

The motor-clutch unit MC (region indicated by cross-sectional hatching in FIG. 1) includes the multi-plate dry clutch 7, the slave cylinder 8 and the motor generator 9. The multi-plate dry clutch 7 is coupled to the engine En, and connects or disconnects driving force transmitted from the engine En. The slave cylinder 8 hydraulically controls the engaging and disengaging of the multi-plate dry clutch 7. The motor generator 9 is disposed at a periphery of the clutch cover 6 of the multi-plate dry clutch 7, and transmits power to the transmission input shaft 5. In the motor-clutch unit MC, a cylinder housing 81 having a first clutch pressure oil passage 85 communicating with the slave cylinder 8 is provided while maintaining sealing properties with an O-ring 10.

The motor generator 9 is a synchronous alternating-current motor, and includes a rotor supporting frame 91 formed integrally with the clutch cover 6, and a rotor 92 supported and fixed to the rotor supporting frame 91 and having a permanent magnet buried therein. The motor generator 9 also includes a stator 94 placed over the rotor 92 with an air gap 93 in between and fixed to the cylinder housing 81, and a stator coil 95 wound around the stator 94. Note that a water jacket 96 for distributing cooling water is formed in the cylinder housing 81.

The transmission unit T is coupled to the motor-clutch unit MC, and includes a transmission housing 41, a V-belt type continuously variable transmission mechanism 42, and an oil pump OP. The V-belt type continuously variable transmission mechanism 42 is built in the transmission housing 41, has a V-belt wound between two pulleys, and obtains a continuously variable transmission gear ratio by changing a belt contact diameter. The oil pump OP is a hydraulic source to produce a hydraulic pressure to required portions, and guides, to the required portions, the hydraulic pressure from a control valve (not shown) to control a transmission hydraulic pressure to a pulley chamber, a clutch/brake hydraulic pressure or the like, using an oil pump pressure as a source pressure. The transmission unit T is further provided with a forward/backward switching mechanism 43, an oil filter 44, an end plate 45 and a clutch unit case 46. The clutch unit case 46 is integrally fixed to the transmission housing 41. The end plate 45 has a second clutch pressure oil passage 47.

The oil pump OP drives a pump by transmitting rotary drive torque of the transmission input shaft 5 through a chain drive mechanism. The chain drive mechanism includes a drive side sprocket 51 configured to rotate along with the rotary drive of the transmission input shaft 5, a driven side sprocket 52 configured to drive a pump shaft 57 to rotate, and a chain 53 wound around the both sprockets 51 and 52. The drive side sprocket 51 is provided between the transmission input shaft 5 and the end plate 45, and is rotatably supported on a stator shaft 54 fixed to the transmission housing 41 by means of a bush 55. The rotary drive torque from the transmission input shaft 5 is transmitted through a first adapter 56 which is spline-fitted to the transmission input shaft 5 and fitted to the drive side sprocket 51 with a claw.

Figure 2:
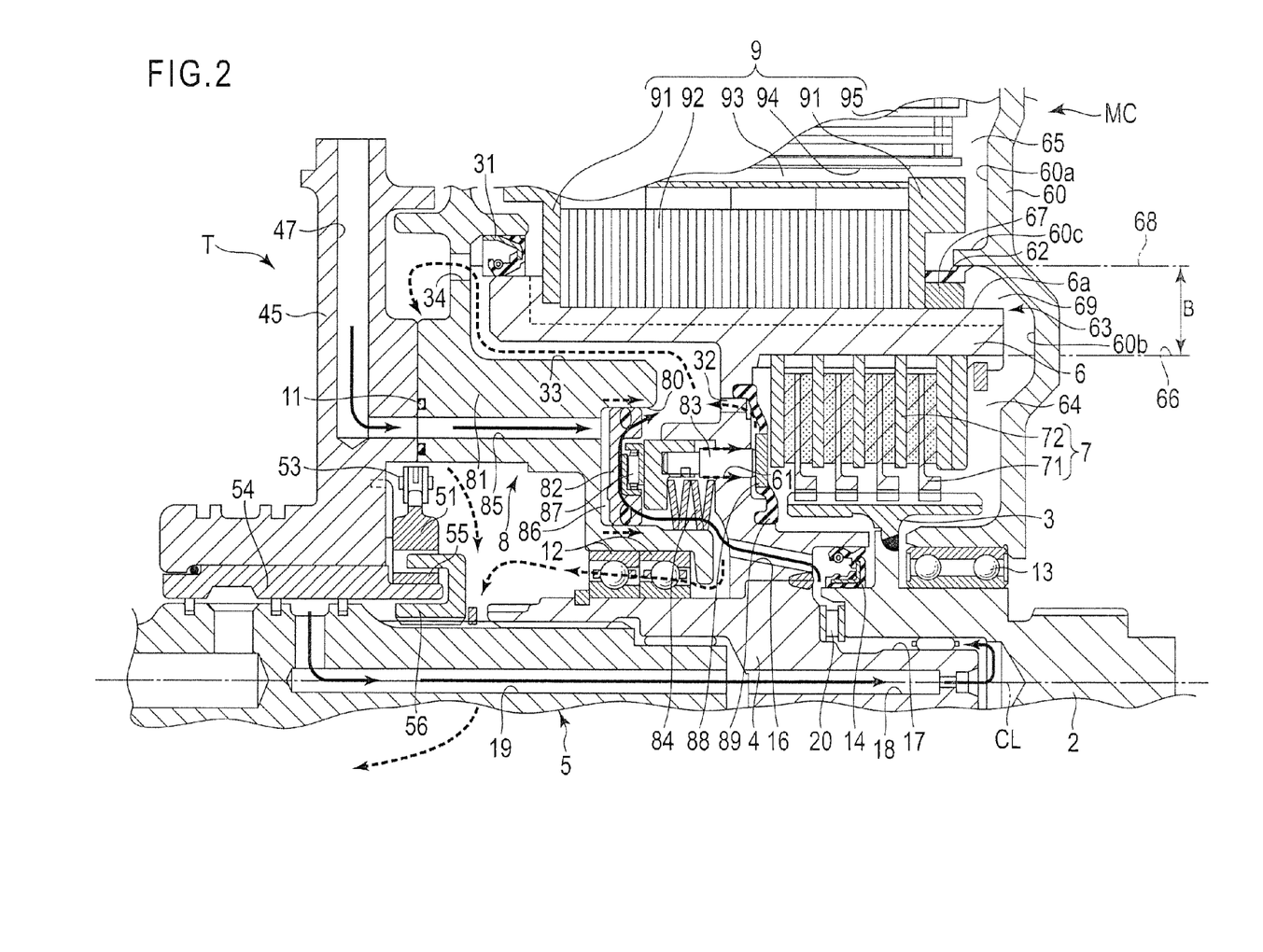
FIG. 2 is a main part cross-sectional view showing a configuration of a multi-plate clutch in a motor clutch unit in the hybrid driving force transmission device of the embodiment.
Figure 3:
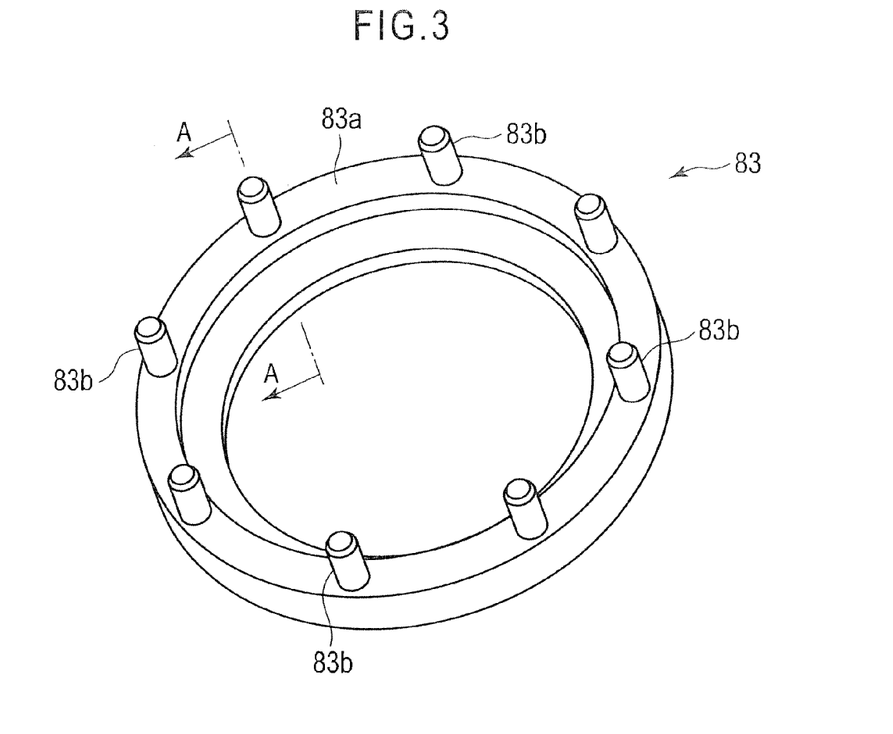
FIG. 3 is a perspective view showing a piston arm of the multi-plate dry clutch of the embodiment.
Figure 4:
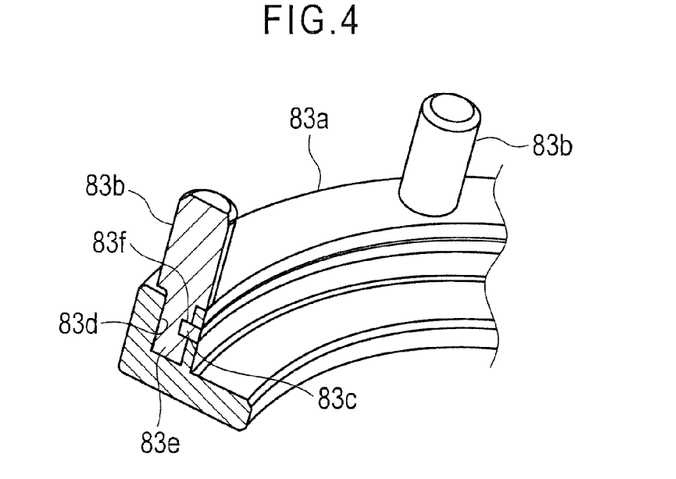
FIG. 4 is a cross-sectional view taken along the line A-A in FIG. 3, showing the piston arm of the multi-plate dry clutch of the embodiment.

FIG. 2 is a main part cross-sectional view showing a configuration of the multi-plate clutch in the motor clutch unit in the hybrid driving force transmission device of the embodiment. FIG. 3 is a perspective view showing a piston arm of the multi-plate dry clutch. FIG. 4 is a cross-sectional view taken along the line A-A in FIG. 3, showing the piston arm. With reference to FIGS. 2 to 4, the configuration of the multi-plate dry clutch 7 in the motor clutch unit MC is described below.

The clutch hub 3 is coupled to the engine output shaft 1 of the engine En. As shown in FIG. 2, a drive plate 71 of the multi-plate dry clutch 7 is splined to the clutch hub 3.

The clutch cover 6 is coupled to the transmission input shaft 5 in the transmission unit T. As shown in FIG. 2, a driven plate 72 of the multi-plate dry clutch 7 is splined to the clutch cover 6.

The multi-plate dry clutch 7 is interposed between the clutch hub 3 and the clutch cover 6 by arranging multiple drive plates 71 and driven plates 72 alternately. More specifically, engaging the multi-plate dry clutch 7 allows for torque transmission between the clutch hub 3 and the clutch cover 6, while disengaging the multi-plate dry clutch 7 disconnects the torque transmission between the clutch hub 3 and the clutch cover 6.

The slave cylinder 8 is a hydraulic actuator configured to control the engaging and disengaging of the multi-plate dry clutch 7, and is disposed between the transmission unit T side and the clutch cover 6. As shown in FIG. 2, the slave cylinder 8 includes a piston 82 slidably provided in a cylinder hole 80 in the cylinder housing 81, a first clutch pressure oil passage 85 formed in the cylinder housing 81 and configured to guide a clutch pressure produced by the transmission unit T, and a cylinder oil chamber 86 communicating with the first clutch pressure oil passage 85. Between the piston 82 and the multi-plate dry clutch 7, not only a piston arm 83 but also a needle bearing 87, a return spring 84 and a pressure plate 88 are interposed as shown in FIG. 2.

The piston arm 83 uses the pressure from the slave cylinder 8 to generate a pressing force toward the multi-plate dry clutch 7, and is provided slidably in a through-hole 61 formed in the clutch cover 6. The return spring 84 is interposed between the piston arm 83 and the clutch cover 6, and is formed by combining multiple disc springs. The needle bearing 87 is interposed between the piston 82 and the piston arm 83, and prevents the piston 82 from rotating along with the rotation of the piston arm 83. The pressure plate 88 is provided integrally with an elastic support plate 89, and is elastically supported by the clutch cover 6. The pressure plate 88 and the elastic support plate 89 form a partition elastic member to block leak oil from a sliding part of the piston arm 83 from flowing into the multi-plate dry clutch 7. To be more specific, the pressure plate 88 and the elastic support plate 89, which are tightly fixed at a piston arm attachment position on the clutch cover 6, realize a partition function to divide a wet space with the slave cylinder 8 disposed therein from a dry space with the multi-plate dry clutch 7 disposed therein.

As shown in FIGS. 3 and 4, the piston arm 83 includes a ring-shaped arm body 83a, multiple arm pins 83b provided so as to protrude from the arm body 83a, and a snap ring 83c to fix the arm pins 83b to the arm body 83a. In assembly of the piston arm 83, pin legs 83e of the arm pins 83b are inserted into multiple pin holes 83d formed in the arm body 83a, and ring fitting grooves 83f formed in the pin legs 83e are set to face the center position of the arm body 83a. Thereafter, the snap ring 83c is inserted from inside in a state of being reduced in diameter by applying force thereto, and then the force applied to the snap ring 83c is released to restore the snap ring to its original diameter with elastic restoring force. Thus, the snap ring 83c is fitted to the ring fitting grooves 83f, and at the same time, all the arm pins 83b are fixed to the arm body 83a.

As shown in FIG. 2, a leak oil recovery passage in the embodiment includes first bearings 12, 12, a first seal member 31, a leak oil passage 32, a first oil recovery passage 33 and a second oil recovery passage 34. More specifically, the leak oil recovery passage is a circuit to return the leak oil from the sliding part of the piston 82 to the transmission unit T through the first and second oil recovery passages 33 and 34 tightly sealed by the first seal member 31. Moreover, the leak oil recovery passage is also a circuit to return the leak oil from the sliding part of the piston arm 83, besides the leak oil described above, to the transmission unit T through the leak oil passage 32 tightly sealed by the partition elastic member (the pressure plate 88 and the elastic support plate 89) and the first and second oil recovery passages 33 and 34 tightly sealed by the first seal member 31.

The first bearings 12, 12 rotatably support the clutch cover 6 relative to the cylinder housing 81, and are provided in a pair to prevent a tilt in the shaft of the clutch cover 6. Moreover, in order to prevent a positional shift in the shaft center of the clutch cover 6 relative to the cylinder housing 81, no other objects than the first bearings 12, 12 are interposed between the cylinder housing 81 and the clutch cover 6.

As shown in FIG. 2, the first seal member 31 is disposed downstream of the partition elastic member (the pressure plate 88 and the elastic support plate 89) in the flow direction of the leak oil, and tightly seals between opposed faces of the cylinder housing 81 (stationary member) and the clutch cover 6 (rotary member). The first seal member 31 has a lip seal structure which exerts sealing performance using seal elastic force, and secures stable sealing performance by the first bearings 12, 12 suppressing a positional shift in the shaft center of the clutch cover 6.

As shown in FIG. 2, the leak oil passage 32 is formed so as to penetrate the clutch cover 6 and allow the first oil recovery passage 33 to communicate with a tightly sealed space formed by the partition elastic member (the pressure plate 88 and the elastic support plate 89).

As shown in FIG. 2, the first oil recovery passage 33 is formed of a gap between the cylinder housing 81 and the clutch cover 6. Moreover, the first seal member 31 and the second oil recovery passage 34 are disposed at positions on the outer peripheral side than the sliding parts of the piston 82 and the piston arm 83. Thus, the second oil recovery passage 34 is formed to be an oil passage extending toward the outer periphery from the sliding parts of the piston 82 and the piston arm 83.

As shown in FIG. 2, the second oil recovery passage 34 is formed downstream of the first seal member 31 as a short oil passage in the cylinder housing 81. Meanwhile, a long oil passage upstream of the first seal member 31 is the first oil recovery passage 33 formed of the gap between the cylinder housing 81 and the clutch cover 6.

As shown in FIG. 2, a bearing lubricating oil passage of the embodiment includes a needle bearing 20, a second seal member 14, a first shaft center oil passage 19, a second shaft center oil passage 18 and a lubricating oil passage 16. The bearing lubricating oil passage is for bearing lubrication, in which hearing lubricating oil from the transmission unit T is returned to the transmission unit T through the needle bearing 20, the first bearings 12, 12 rotatably supporting the clutch cover 6 relative to the cylinder housing 81, and the needle bearing 87 interposed between the piston 82 and the piston arm 83.

As shown in FIG. 2, the needle bearing 20 is set between opposed faces of the clutch hub 3 and the clutch cover 6 axially facing each other. The needle bearing 20 restrains the clutch hub 3 and the clutch cover 6 from moving back and forth in the axial direction, and also allows for relative rotation of the clutch hub 3 and the clutch cover 6.

As shown in FIG. 2, the second seal member 14 is interposed between the clutch hub 3 and the clutch cover 6. The second seal member 14 prevents the bearing lubricating oil from flowing from the wet space with the slave cylinder 8 disposed therein into the dry space with the multi-plate dry clutch 7 disposed therein.

The first shaft center oil passage 19 is formed at the shaft center of the transmission input shaft 5. The second shaft center oil passage 18 is formed in the clutch cover 6 and communicates with the first shaft center oil passage 19. The lubricating oil passage 16 is formed in the clutch cover 6 and communicates with the second shaft center oil passage 18 through a gap 17 with the clutch hub 3 and the needle bearing 20.

Next, with reference to FIG. 2, description is given of a dust seal structure to seal dust from the multi-plate dry clutch 7 in the motor clutch unit MC, and of a dust collection structure to collect the dust from the multi-plate dry clutch 7.

As shown in FIG. 2, the dust countermeasure structure of the embodiment includes the motor generator 9 (motor), the multi-plate dry clutch 7 (dry clutch), the sing cover 60 (housing), a dust seal member 62 and a dust collection structure 63.

The motor generator 9 is fixed to the clutch cover 6, and includes a rotor 92 configured to rotate around a rotor shaft CL, a stator 94 fixed to the cylinder housing 81 and provided with a stator coil 95 wound therearound, and an air gap 93 that is a gap radially between the rotor 92 and the stator 94. Note that the rotor 92 has both axial end faces fixed to an outer peripheral surface of the clutch cover 6 in a state of being sandwiched between rotor supporting frames 91, 91.

The multi-plate dry clutch 7 is disposed at a position inner than the motor generator 9, and connects or disconnects driving force transmitted from the engine En. As shown in FIG. 2, a drive plate 71 (friction element) of the multi-plate dry clutch 7 is splined to the clutch hub 3 coupled to the clutch hub shaft 2. As shown in FIG. 2, a driven plate 72 (friction element) of the multi-plate dry clutch 7 is splined to the clutch cover 6 fixed to the clutch cover shaft 4. To be more specific, the multi-plate dry clutch 7 is configured by alternately arranging multiple drive plates 71 and driven plates 72 between the clutch hub 3 and the clutch cover 6.

The housing cover 60 is a housing member integrally fixed to the cylinder housing 81 and covering the motor generator 9 and the multi-plate dry clutch 7 (see FIG. 1). The internal space formed by covering the housing cover 60 and the cylinder housing 81 is divided into a rotor shaft CL side space serving as a clutch chamber 64 to house the multi-plate dry clutch 7, and a space on an outer side of the clutch chamber 64 serving as a motor chamber 65 to house the motor generator 9. The clutch chamber 64 and the motor chamber 65 are dry spaces which shut out oil.

Note that the cylinder housing 81 is a stationary member supported by the first bearings 12, 12 relative to the clutch cover shaft 4, and the housing cover 60 is a stationary member supported by a second bearing 13 relative to the clutch hub shaft 2.

The dust seal member 62 is disposed at a position radially outside a clutch chamber open surface 66 that is an outer peripheral boundary of the drive plate 71 and the driven plate 72, and seals between the rotor 92 and an inner wall 60a of the housing cover 60. The dust seal member 62 is attached to a ring member 67 press-fitted to an outer peripheral surface 6a of the clutch cover 6, and has a lip seal structure to generate contact pressure from deformation of an elastic material.

The dust collection structure 63 forms a dust collection space 69 in a region B radially between a seal surface 68 formed by the dust seal member 62 and the clutch chamber open surface 66. The dust collection structure 63 basically forms a dust collection space 69 surrounded by the outer peripheral surface 6a of the clutch cover 6, the dust seal member 62 and an inner wall 60a of a housing cover 60, with the dust seal member 62 disposed at a position radially outside the clutch cover 6.

In the case of the embodiment, first, an inner wall concave portion 60b, into which an axial front end of the clutch cover 6 is inserted, is formed in the housing cover 60, and an inner wall protrusion 60c is formed at a position radially outside the inner wall concave portion 60b. As shown in FIG. 2, the dust collection structure 63 of the embodiment uses the dust seal member 62 to seal between the outer peripheral surface 6a of the clutch cover 6 and the inner wall protrusion 60c of the housing cover 60 at the position radially outside the inner wall concave portion 60b. Thus, the dust collection structure 63 forms the dust collection space 69 surrounded by the outer peripheral surface 6a of the clutch cover 6, the side surface of the ring member 67, the dust seal member 62, and the inner wall protrusion 60c and inner wall concave portion 60b of the housing cover 60.

Next, operations are described.

First, "Problems in Comparative Embodiment" is described. Then, operations of the hybrid driving force transmission device according to the embodiment are described by classifying the operations into "clutch pressure and leak oil recovery passage setting operation," "dust seal operation and dust collection operation from multi-plate dry clutch," "clutch control operation by slave cylinder," "leak oil recovery operation from slave cylinder," and "bearing lubrication operation."

[Problems in Comparative Embodiment]

Figure 5:
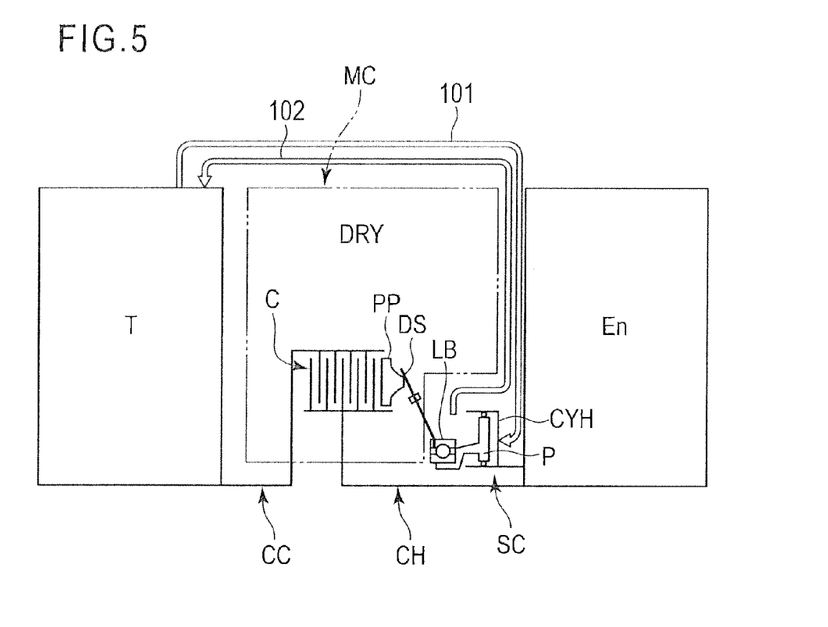
FIG. 5 is an explanatory view schematically showing a basic structure of a hybrid driving force transmission device of a comparative embodiment.

FIG. 5 is an explanatory view schematically showing a basic structure of a hybrid driving force transmission device of a comparative embodiment. The problems in the comparative embodiment are described below.

As shown in FIG. 5, the hybrid driving force transmission device of the comparative embodiment includes a clutch hub CH coupled to an output shaft of an engine En, a clutch cover CC fixed to a rotor of an electric motor and coupled to an input shaft of a transmission unit T, a multi-plate dry clutch C interposed between the clutch hub CH and the clutch cover CC, and a slave cylinder SC configured to control the engaging and disengaging of the multi-plate dry clutch C.

The slave cylinder SC of the comparative embodiment includes a piston P slidably provided in a cylinder housing CYH and a release bearing LB provided at a tip of the piston P. Between the release bearing LB and the multi-plate dry clutch C, a diaphragm spring DS and a pressure plate PP are provided. To control the engaging and disengaging of the multi-plate dry clutch C, the multi-plate dry clutch C is brought into an engaged state by a biasing force of the diaphragm spring DS, and is brought into a disengaged state by a hydraulic pressure of the slave cylinder SC.

However, the hybrid driving force transmission device of the comparative embodiment has the configuration in which the slave cylinder SC is arranged between the clutch hub CH and the engine En, i.e., the configuration in which the engine En, the slave cylinder SC, the clutch hub CH, the multi-plate dry clutch C, the clutch cover CC and the transmission unit T are arranged in this order. Thus, the clutch hub CH, the multi-plate dry clutch C and the clutch cover CC are interposed between the slave cylinder SC and the transmission unit T, and the slave cylinder SC and the transmission unit T are spaced apart in the axial direction. This layout makes it difficult to set a leak oil recovery passage to recover leak oil from a piston sliding portion of the slave cylinder SC and to return the leak oil to the transmission unit T.

To be more specific, in the case of the slave cylinder using high-pressure hydraulic oil, leakage of the hydraulic oil cannot be completely prevented because of the structure. Moreover, between the slave cylinder SC and the transmission unit T, a dry space is formed, in which the multi-plate dry clutch C and an electric motor (not shown) which hate intrusion of the hydraulic oil from the outside are disposed. For this reason, to supply clutch hydraulic pressure from the transmission unit T to the slave cylinder SC, a long clutch pressure oil passage 101 using a pipe and the like needs to be extended from the outer periphery of the housing while avoiding the dry space. Similarly, to return the leak oil in the slave cylinder SC to the transmission unit T, a long recovery oil passage 102 using a pipe and the like needs to be extended from the outer periphery of the housing while avoiding the dry space.

Accordingly, the slave cylinder SC and the transmission unit T are spaced apart in the axial direction, and a hydraulic source for the motor clutch unit is provided separately from that for the transmission unit T. Therefore, the hydraulic source specifically for the motor clutch unit is required.

[Clutch Pressure and Leak Oil Recovery Passage Setting Operation]

Figure 6:
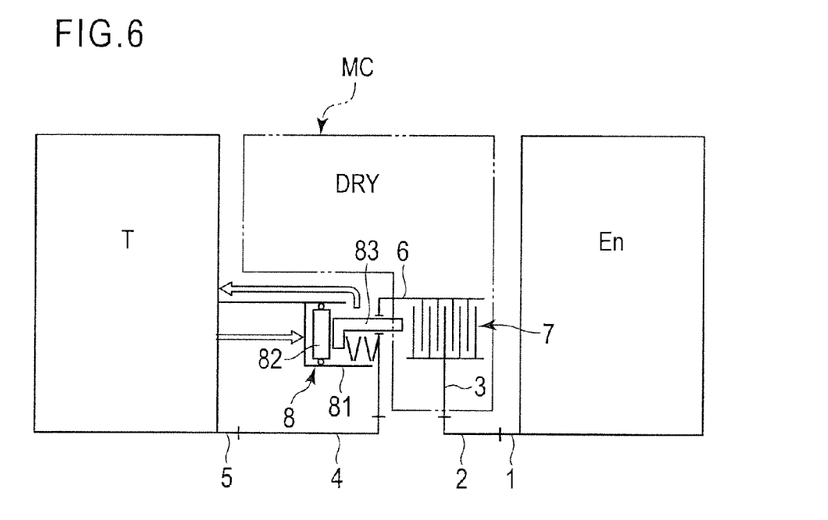
FIG. 6 is an explanatory view schematically showing a basic structure of the hybrid driving force transmission device of the embodiment.

FIG. 6 is an explanatory view schematically showing a basic structure of the hybrid driving force transmission device of the embodiment. An operation of setting a clutch pressure oil passage and a leak oil recovery passage according to the embodiment is described below.

As shown in FIG. 6, the motor clutch unit MC of the embodiment includes the clutch hub 3 coupled to the engine output shaft 1 of the engine En, the clutch cover 6 coupled to the transmission input shaft 5 of the transmission unit T, the multi-plate dry clutch 7 interposed between the clutch hub 3 and the clutch cover 6, and the slave cylinder 8 configured to control the engaging and disengaging of the multi-plate dry clutch 7. In the embodiment, the slave cylinder 8 has the configuration including the piston 82 provided slidably in the cylinder housing 81 and the piston arm 83 provided so as to penetrate the clutch cover 6. This configuration enables a layout in which the slave cylinder 8 is disposed between the transmission unit T and the clutch cover 6.

As described above, by disposing the slave cylinder 8 between the transmission unit T and the clutch cover 6, the engine En, the clutch hub 3, the multi-plate dry clutch 7, the clutch cover 6, the slave cylinder 8 and the transmission unit T are arranged in this order, and the slave cylinder 8 and the transmission unit T are disposed adjacent to each other, as shown in FIG. 6. Thus, to supply the clutch oil pressure from the transmission unit T to the slave cylinder 8, the first clutch pressure oil passage 85 having a short oil passage length only needs to be formed in the cylinder housing 81.

Likewise, the leak oil recovery passage or bearing lubricating oil passage to return the leak oil or bearing lubricating oil to the transmission unit T can be configured simply. The configuration may be as simple as that the leak coil or bearing lubricating oil is returned to the transmission unit T by using the oil passage or a gap while receiving the oil with the first and second seal members 31 and 14 so as to prevent the oil from flowing into the dry space. As a result, unlike the comparative embodiment, the leak oil recovery passage or bearing lubricating oil passage does not have to be extended and can be easily set.

[Dust Seal Operation and Dust Collection Operation from Multi-Plate Dry Clutch]

Figure 7:
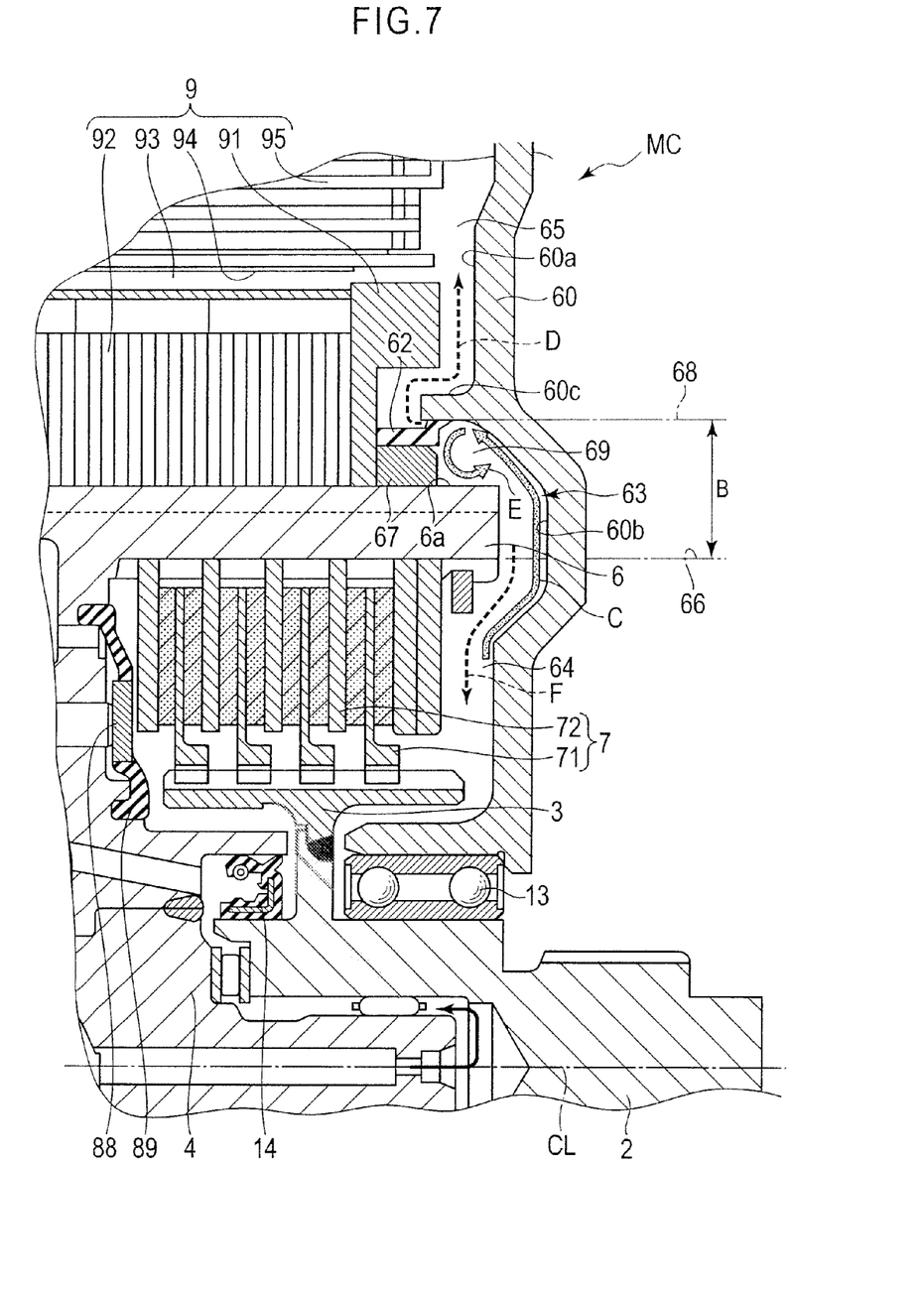
FIG. 7 is an operation explanatory view showing a dust seal operation and a dust collection operation in the hybrid driving force transmission device of the embodiment.

FIG. 7 is an operation explanatory view showing a dust seal operation and a dust collection operation in the hybrid driving force transmission device of the embodiment. With reference to FIG. 7, description is given below of the dust seal operation and the dust collection operation from the multi-plate dry clutch 7.

In the embodiment, as shown in FIG. 7, the dust seal member 62 configured to seal between the rotor 92 of the motor generator 9 and the inner wall 60a of the housing cover 60 is disposed at the position radially outside the clutch chamber open surface 66 that is the outer peripheral boundary of the drive plate 71 and the driven plate 72 which are the friction elements of the multi-plate dry clutch 7. Thus, dust such as abrasion powder is produced when the drive plate 71 and the driven plate 72 of the multi-plate dry clutch 7 come into pressure contact with each other. The dust is moved in the outside diameter direction as indicated by the arrow C in FIG. 7 under the influence of the centrifugal force produced by the rotation of the rotor. However, the dust seal member 62 disposed at the position radially outside the clutch chamber open surface 66 prevents the dust moved in the outside diameter direction from entering into the motor chamber 65 housing the rotor 92 and the stator 94 of the motor generator 9 and the like as indicated by the arrow D.

As a result, friction increase, abrasion, performance degradation and the like of the motor generator 9 due to the dust such as abrasion powder, which is generated on the clutch chamber 64 side, entering into the motor chamber 65 side are prevented. Particularly, when metal powder contained in the clutch abrasion powder enters into the motor chamber 65, leakage or influences on the magnet are increased.

Meanwhile, the dust collection structure 63 is provided, which forms the dust collection space 69 in the region B radially between the seal surface 68 formed by the dust seal member 62 and the clutch chamber open surface 66. Accordingly, the dust received by the dust seal member 62 is caught and collected in the dust collection space 69 between the seal surface 68 and the clutch chamber open surface 66, as indicated by the arrow E in FIG. 7. Thus, the dust from the clutch chamber 64 is returned to the clutch chamber 64 by the gravity upon disengaging of the centrifugal force, thereby preventing deposition of the dust such as abrasion powder inside the clutch chamber 64, as indicated by the arrow F in FIG. 7.

This prevents an increase in drag torque at the multi-plate dry clutch 7, facilitation of spline abrasion at a spline-fit portion between the drive plate 71 and the driven plate 72, and the like due to the deposition of the dust such as abrasion powder inside the clutch chamber 64.

The embodiment employs, as the dust collection structure 63, the structure in which the dust seal member 62 is disposed at the position radially outside the clutch cover 6 to which the rotor 92 is fixed. This structure enables the dust such as abrasion powder to enter into the dust collection space 69 including the outer peripheral surface 6a of the clutch cover 6, and thus prevents the dust such as abrasion powder that has entered from returning to the clutch chamber 64.

Moreover, the embodiment employs, as the dust collection structure 63, the structure in which the inner wall concave portion 60b, into which the axial front end of the clutch cover 6 is inserted, is formed in the housing cover 60, and the dust seal member 62 is disposed at the position radially outside the inner wall concave portion 60b. Therefore, a detour return structure for the dust is realized using a detour gap space formed between the axial front end of the clutch cover 6 and the inner wall concave portion 60b of the housing cover 60. This structure further prevents the dust such as abrasion powder that has entered from returning to the clutch chamber 64.

Furthermore, the embodiment employs, as the dust collection structure 63, the structure in which the inner wall protrusion 60c is formed at the position radially outside the inner wall concave portion 60b of the housing cover 60, and the dust seal member 62 seals between the outer peripheral surface 6a of the clutch cover 6 and the inner wall protrusion 60c of the housing cover 60.

As a result, a detour return structure for the dust is achieved using labyrinth-like detour gap space formed between the axial front end of the clutch cover 6 and the inner wall concave portion 60b and inner wall protrusion 60c of the housing cover 60. The inner wall protrusion 60c and the dust seal member 62 from the outer peripheral surface 6a of the clutch cover 6 allow the axial position of the seal surface 68 of the dust seal member 62 to correspond to the axial position of the outer peripheral surface 6a of the clutch cover 6. As a result, not only the dust such as abrasion powder that has entered is further prevented from returning to the clutch chamber 64, but also the dust collection space 69 to collect the dust such as abrasion powder is sufficiently secured by the inner wall protrusion 60c and the dust seal member 62.

[Clutch Control Operation by Slave Cylinder]

With reference to FIG. 2, description is given of a clutch control operation to engage and disengage the multi-plate dry clutch 7 by the slave cylinder 8.

In engaging the multi-plate dry clutch 7 by the slave cylinder 8, the clutch hydraulic pressure produced by the transmission unit T is supplied to the cylinder oil chamber 86 through the first clutch pressure oil passage 85 formed in the cylinder housing 81. Accordingly, hydraulic pressure force obtained by multiplying the hydraulic pressure by the area that receives the pressure acts on the piston 82 and causes the piston 82 to make a stroke to the right in FIG. 2 against the biasing force of the return spring 84 interposed between the piston arm 83 and the clutch cover 6. Then, the engaging force obtained by a difference between the hydraulic pressure force and the biasing force is transmitted to the piston 82, the needle bearing 87, the piston arm 83 and the pressure plate 88 in this order. Then, the engaging force pressurizes the drive plate 71 and the driven plate 72, thereby engaging the multi-plate dry clutch 7.

In disengaging the multi-plate dry clutch 7 in the engaged state, the hydraulic oil supplied to the cylinder oil chamber 86 is taken out into the transmission unit T through the clutch pressure oil passage 85, thereby lowering the hydraulic pressure hydraulic pressure and causes the piston arm 83 to make a stroke to the left in FIG. 2. As a result, the engaging force transmitted to the pressure plate 88 is released, and thus the multi-plate dry clutch 7 is disengaged.

[Leak Oil Recovery Operation from Slave Cylinder]

The multi-plate dry clutch 7 is engaged by supplying the high clutch hydraulic pressure to the cylinder oil chamber 86 in the slave cylinder 8 as described above. Accordingly, the hydraulic oil cannot be prevented from leaking from the sliding part of the piston 82 or the sliding part of the piston arm 83 due to deformation of the piston seal or the like.

Therefore, a leak oil recovery passage to recover the hydraulic oil leaking from the sliding part of the piston 82 by returning the oil to the transmission unit T, and a leak oil recovery passage to recover the hydraulic oil leaking from the sliding part of the piston arm 83 by returning the oil to the transmission unit T are required. With reference to FIG. 2, description is given below of a leak oil recovery operation for the hydraulic oil leaking from the sliding part of the piston 82, and a leak oil recovery operation for the hydraulic oil leaking from the sliding part of the piston arm 83.

First, description is given of the leak oil recovery operation for the hydraulic oil leaking from the sliding part of the piston 82.

If the hydraulic oil leaks from the sliding part of the piston 82 in the slave cylinder 8 when the clutch cover 6 is rotated, such as during driving, centrifugal force acts on the leak oil. The centrifugal force moves the leak oil in the outside diameter direction, as indicated by the dotted arrow in FIG. 2, through the first recovery oil passage 33 formed of a gap between the cylinder housing 81 and the clutch cover 6. However, the leak oil moved in the outside diameter direction is sealed by the first seal member 31 interposed between the cylinder housing 81 and the clutch cover 6, and is prevented from entering into the dry space in which the motor generator 9 and the multi plate dry clutch 7 are disposed. Then, the leak oil in the outside diameter direction moved toward the inside diameter direction through the second recovery oil passage 34 formed in the cylinder housing 81, and is then returned to the transmission unit T.

Some of the leak hydraulic oil from the sliding part of the piston 82 in the slave cylinder 8, i.e. the leak oil flowing in the inside diameter direction under little influence of the centrifugal force is returned to the transmission unit T through the return spring 84 and the first bearings 12, 12.

Therefore, the leak oil from the sliding part of the piston 82 can be recovered to the transmission unit T while preventing the leak oil from entering into the dry space in which the multi-plate dry clutch 7 and the motor generator 9 are disposed.

Next, description is given of the leak oil recovery operation for the hydraulic oil leaking from the sliding part of the piston arm 83.

Some of the hydraulic oil enters into the sliding part of the piston arm 83, and leaks into the tightly sealed space formed by the partition elastic member (the pressure plate 88 and the elastic support plate 89). If the centrifugal force acts on the leak oil leaking into the tightly sealed space, the leak oil passes through the leak oil passage 32 penetrating the clutch cover 6 and flows into the first recovery oil passage 33 formed of the gap between the cylinder housing 81 and the clutch cover 6. Then, the centrifugal force moves the leak oil in the outside diameter direction through the first recovery oil passage 33, and then returns the leak oil to the transmission unit T through the second recovery oil passage 34 formed in the cylinder housing 81.

Therefore, the leak oil from the sliding part of the piston arm 83 can be recovered to the transmission unit T while preventing the leak oil from entering into the dry space in which the multi-plate dry clutch 7 and the motor generator 9 are disposed.

[Bearing Lubrication Operation]In the case of the hybrid driving force transmission device of the embodiment, the needle bearing 20, the first bearings 12, 12 and the needle bearing 87 are set as the bearings. Since a large force acts on these bearings during driving involving repetitions of the engaging and disengaging of the multi-plate dry clutch 7, bearing lubrication is required to suppress generation of friction heat and to exert smooth support action. Hereinafter, description is given of a bearing lubrication operation to lubricate the respective bearings 20, 12, 12, 87 set in the wet space in the hybrid driving force transmission device.

When bearing lubricating oil is produced by the transmission unit T during driving or the like, the bearing lubricating oil passes through the first shaft center oil passage 19, the second shaft center oil passage 18, the gap 17 and the needle bearing 20 as indicated by the solid arrow in FIG. 2. Thereafter, the bearing lubricating oil passes through the lubricating oil passage 16 from the gap sealed by the second seal member 14, and then the flow passage is divided into two passages at about the exit of the lubricating oil passage 16. In one of the passages, the oil is returned to the transmission unit T through the first bearings 12, 12. In the other passage, the oil is returned to the transmission unit T through the needle bearing 87, the first recovery oil passage 33 formed between the cylinder housing 81 and the clutch cover 6 and sealed by the first seal member 31, and the second recovery oil passage 34 formed in the cylinder housing 81.

Therefore, the bearing lubricating oil produced by the transmission unit T can lubricate the needle bearing 20, the first bearings 12, 12 and the needle bearing 87 while preventing the oil from entering into the dry space in which the multi-plate dry clutch 7 and the motor generator 9 are disposed. Furthermore, the configuration described above uses the leak oil recovery passage in returning the bearing lubricating oil to the transmission unit 1. Thus, not only the bearing lubrication configuration can be simplified, but also the leak oil from the sliding part of the piston 82 can be readily recovered together with the bearing lubricating oil, to the transmission unit T.

Next, effects are described.

The hybrid driving force transmission device of the embodiment can achieve the following effects.

(1) A driving force transmission device includes: a motor (the motor generator 9) configured to rotate around a rotor shaft CL; a dry clutch (the multi-plate dry clutch 7) disposed at a position inner than the motor (the motor generator 9), and configured to connect or disconnect transmission of driving force; a housing (the housing cover 60) provided so as to cover the motor (the motor generator 9) and the dry clutch (the multi-plate dry clutch 7), and configured to divide the internal space into a space on the rotor shaft side serving as a clutch chamber 64 to house friction elements (the drive plate 71 and the driven plate 72) of the dry clutch (the multi-plate dry clutch 7), and a space on an outer side of the clutch chamber 64 serving as a motor chamber 65 to house a rotor 92 and a stator 94 of the motor (the motor generator 9); a dust seal member 62 disposed at a position radially outside of a clutch chamber open surface 66 that is an outer peripheral boundary of the friction elements (the drive plate 71 and the driven plate 72), and configured to seal between the rotor 92 and an inner wall 60*a* of the housing (the housing cover 60); and a dust collection structure 63 configured to form a dust collection space 69 in a region radially between a seal surface 68 formed by the dust seal member 62 and the clutch chamber open surface 66.

This configuration makes it possible to prevent dust from the clutch chamber 64 from entering into the motor chamber 65, and to prevent deposition of the dust inside the clutch chamber 64.

(2) The dust collection structure 63 forms the dust collection space 69 surrounded by the outer peripheral surface 6*a* of the clutch cover, the dust seal member 62 and the inner wall 60*a* of the housing (the housing cover 60), with the dust seal member 62 disposed at a position radially outside the clutch cover 6 to which the rotor 92 is fixed.

Thus, in addition to the effect (1) described above, the dust such as abrasion powder that has entered into the dust collection space 69 is prevented from returning to the clutch chamber 64, thereby preventing deposition of the dust inside the clutch chamber 64.

(3) The dust collection structure 63 forms an inner wall concave portion 60*b*, into which an axial front end of the clutch cover 6 is inserted, in the housing (the housing cover 60), and the dust seal member 62 is disposed at a position radially outside the position of the inner wall concave portion 60b. Thus, the dust collection space 69 is formed, which is surrounded by the outer peripheral surface 6a of the clutch cover 6, the dust seal member 62 and the inner wall concave portion 60b of the housing (the housing cover 60).

Thus, in addition to the effect (2) described above, the dust such as abrasion powder that has entered into the dust collection space 69 is further prevented from returning to the clutch chamber 64, thereby effectively preventing deposition of the dust inside the clutch chamber 64.

(4) The dust collection structure 63 forms an inner wall protrusion 60c at a position radially outside the inner wall concave portion 60b of the housing (the housing cover 60), and seals between the outer peripheral surface 6a of the clutch cover 6 and the inner wall protrusion 60c of the housing (the housing cover 60) with the dust seal member 62. Thus, the dust collection space 69 is formed, which is surrounded by the outer peripheral surface 6a of the clutch cover 6, the dust seal member 62 and the inner wall protrusion 60c and inner wall concave portion 60b of the housing (the housing cover 60).

Thus, in addition to the effect (3) described above, the dust such as abrasion powder that has entered into the dust collection space 69 is further prevented from returning to the clutch chamber 64. Moreover, a sufficient space to collect the dust such as abrasion powder can be secured as the dust collection space 69.

While the driving force transmission device of the present invention has been described above based on the embodiment, the concrete configuration is not limited to that of the embodiment, but changes in design, additions and the like can be made without departing from the spirit and scope of the invention as defined in the appended claims.

Although the description was given of the example where the multi-plate dry clutch is used as the dry clutch in the embodiment, a single-plate dry clutch or the like may also be used.

Although the description was given of the example of the normal open dry clutch in the embodiment, a normal-closed dry clutch using a diaphragm spring or the like may also be used.

In the embodiment, the description was given of the example where the dust collection space 69 is formed using the existing housing cover 60 and clutch cover 6 for the dust collection structure 63. However, a dust collection structure may be employed, such that a dust collection space is formed by adding additional parts to the existing housing cover 60 and clutch cover 6.

Moreover, in the embodiment, the description was given of the example where the present invention is applied to the hybrid driving force transmission device including the engine and the motor generator, and using the dry clutch as a drive mode transition clutch. However, the present invention is also applicable to a motor driving force transmission device equipped with only a motor generator as a driving source and using a movement starting clutch as the dry clutch, such as an electric vehicle or a fuel cell vehicle. In short, the present invention is applicable to any driving force transmission device including a drive system having a dry clutch disposed inside the motor.

Industrial Applicability

The driving force transmission device according to the present invention makes it possible to prevent dust from the clutch chamber from entering into the motor chamber, and also to prevent deposition of the dust inside the clutch chamber.

The invention claimed is:

1. A driving force transmission device comprising:
   a motor configured to rotate around a rotor shaft;
   a dry clutch disposed at a position inner than the motor, and configured to connect or disconnect transmission of driving force;
   a housing provided to cover the motor and the dry clutch, and having an internal space wherein a space on the rotor shaft side serves as a clutch chamber to house a friction element of the dry clutch and a space on an outer side of the clutch chamber serves as a motor chamber to house a rotor and a stator of the motor;
   a dust seal member disposed at a position radially outside of a clutch chamber open surface that is an outer peripheral boundary of the friction element, and configured to seal between the rotor and an inner wall of the housing; and
   a dust collection structure forming a dust collection space in a region radially between a seal surface formed by the dust seal member and the clutch chamber open surface.

2. The driving force transmission device according to claim 1, wherein
   the dust collection structure forms the dust collection space surrounded by an outer peripheral surface of the clutch cover, the dust seal member and the inner wall of the housing with the dust seal member disposed at a position radially outside the clutch cover, and the rotor is fixed thereto.

3. The driving force transmission device according to claim 2, wherein
   the dust collection structure forms, in the housing, an inner wall concave portion, wherein an axial front end of the clutch cover is inserted into the inner wall concave portion, and forms the dust collection space surrounded by the outer peripheral surface of the clutch cover, the dust seal member and the inner wall concave portion of the housing with the dust seal member disposed at a position radially outside the position of the inner wall concave portion.

4. The driving force transmission device according to claim 3, wherein
   the dust collection structure forms an inner wall protrusion at a position radially outside the inner wall concave portion of the housing, and forms the dust collection space surrounded by the outer peripheral surface of the clutch cover, the dust seal member and the inner wall protrusion and inner wall concave portion of the housing, with the dust seal member sealing between the outer peripheral surface of the clutch cover and the inner wall protrusion of the housing.

* * * * *